T. L. PETERSON.
GAGE GLASS FOR STEAM BOILERS.
APPLICATION FILED NOV. 21, 1916.
1,227,305.
Patented May 22, 1917.
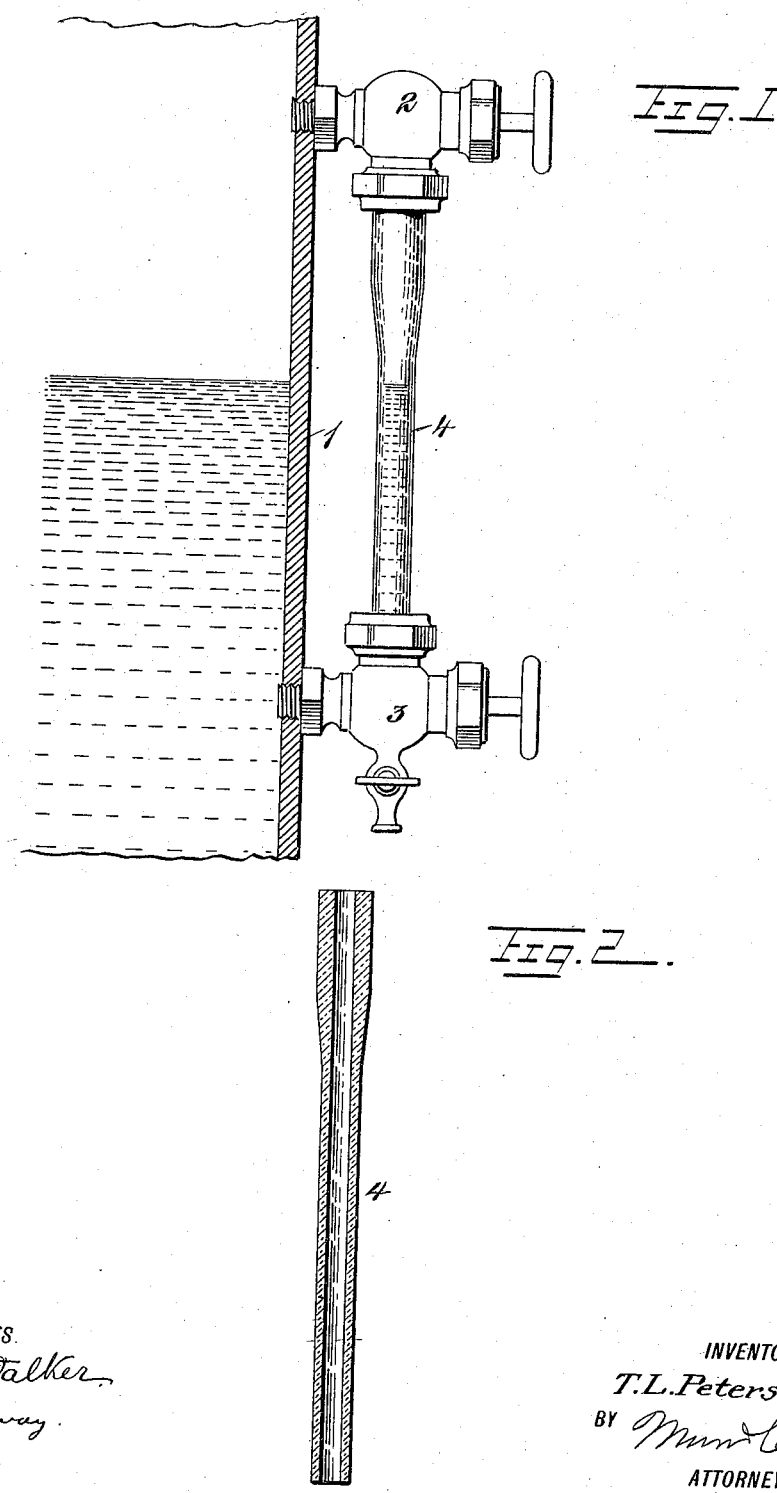

UNITED STATES PATENT OFFICE.

THEODORE L. PETERSON, OF BROOKLYN, NEW YORK.

GAGE-GLASS FOR STEAM-BOILERS.

1,227,305.  Specification of Letters Patent.  Patented May 22, 1917.

Application filed November 21, 1916. Serial No. 132,581.

*To all whom it may concern:*

Be it known that I, THEODORE L. PETERSON, a citizen of the United States, and a resident of the city of New York, borough of Brooklyn, in the county of Kings and State of New York, have invented a new and Improved Gage-Glass for Steam-Boilers, of which the following is a full, clear, and exact description.

This invention relates to gage glasses especially designed for steam boilers. Gage glasses now in common use are in the form of glass tubes with a wall of uniform thickness throughout its length. The upper or steam end of the gage glass wears away by the corrosive action of the steam, resulting in the breakage of the gage glass under the steam pressure sooner or later, with the attendant liability to injury or risk of life of the engineer and causing considerable annoyance in shutting off the steam and renewal of the broken gage glass.

The invention has for its general objects to improve gage glasses in such a manner as to considerably prolong the life thereof by making the upper end of the glass with a wall of considerable thickness compared with the intermediate portion and lower end of the glass, so that, notwithstanding the corrosive action of the steam, the glass will last as long at the upper end as at the lower end approximately, thus reducing the number of blow-outs in a given period. This advantage is attained by a construction which is comparatively simple and inexpensive and does not involve any change in the design of the gage glass connections or fittings with the boiler.

With such objects in view, and others which will appear as the description proceeds, the invention comprises various novel features of construction and arrangement of parts which will be set forth with particularity in the following description and claims appended hereto.

In the accompanying drawing which illustrates one embodiment of the invention and wherein similar characters of reference indicate corresponding parts in both the views, Figure 1 is a side view of the improved gage glass applied to a boiler; and Fig. 2 is a longitudinal section of the gage glass.

Referring to the drawing, 1 designates a boiler to the wall of which is applied the upper gage glass connection 2 and the lower gage glass connection 3, both of which are of usual construction and to which is fitted the gage glass 4, this gage glass being in the form of a tube of any desired length and of any size internal diameter. The wall of the gage glass is preferably of uniform thickness from its lower end to a point a few inches from the top where the wall increases in thickness. This increased thickness of wall may be produced by enlarging externally the diameter of the tube, or internally, or both internally and externally, the object of increasing the thickness of the wall being to increase the total life of the gage glass under the corrosive action of the steam in the upper end of the glass. The ends of the gage glass are clamped in the connections 2 and 3 in the usual manner.

Having thus described my invention, I claim as new and desire to secure by Letters Patent:

1. A water level gage for steam boilers, comprising a glass tube, the wall of which at the upper extremity of the tube is of greater thickness than the wall at the intermediate portion, the bore of the tube being of uniform internal diameter.

2. A water level gage for steam boilers, comprising a glass tube of uniform internal and external diameter throughout its intermediate and lower portion and having its wall increased in thickness at its upper portion over that of the lower portion to withstand the corrosive action of the steam.

THEODORE L. PETERSON.

Copies of this patent may be obtained for five cents each, by addressing the "Commissioner of Patents, Washington, D. C."